United States Patent [19]

Mahr et al.

[11] 4,153,140

[45] May 8, 1979

[54] LUBRICATION TECHNIQUE AND APPARATUS

[75] Inventors: René N. Mahr, Howald-Hesperange; Giovanni Cimenti, Luxembourg, both of Luxembourg

[73] Assignee: S.A. des Anciens Etablissements Paul Wurth, Luxembourg, Luxembourg

[21] Appl. No.: 818,431

[22] Filed: Jul. 25, 1977

[30] Foreign Application Priority Data

Aug. 6, 1976 [LU] Luxembourg .......................... 75564

[51] Int. Cl.² .............................................. F16N 7/36
[52] U.S. Cl. .................................... 184/6; 184/27 R; 414/206
[58] Field of Search ............. 184/27 R, 26, 6 R, 1 R, 184/6.14, 6.17, 75; 214/35 R, 17 CB

[56] References Cited

U.S. PATENT DOCUMENTS

| 1,182,777 | 5/1916 | Lavoo | 184/27 R |
|---|---|---|---|
| 1,393,584 | 10/1921 | Stone | 184/27 R |
| 2,320,140 | 5/1943 | Kocher | 184/27 R |
| 2,810,457 | 10/1957 | Halliday | 184/27 R X |
| 3,814,403 | 6/1974 | Legille | 214/17 CB X |
| 3,880,302 | 4/1975 | Legille | 214/35 R |

*Primary Examiner*—David H. Brown

[57] ABSTRACT

Lubrication for a rotary shaft positioned within the upper region of a blast furnace is accomplished by mounting a mechanically actuated pump for rotation with a reduction gear box through which the rotatable shaft is driven. The pump is periodically operated by means of an adjustable cam plate mounted on a sector gear which is affixed to the rotatable shaft; torque being transmitted to the shaft via the sector gear which is driven by a pinion coupled to the reduction gearing.

12 Claims, 3 Drawing Figures

LUBRICATION TECHNIQUE AND APPARATUS

BACKGROUND OF THE INVENTION (1) Field of the Invention

The present invention relates to the lubrication of movable members located in an inaccessible location and particularly to the intermittent delivery of a lubricant to a bearing surface located within a shaft furnace. More specifically, this invention relates to lubrication devices for incorporation in the drive and support mechanism for a charge distribution chute which is mounted within a blast furnace. Accordingly, the general objects of the present invention are to provide novel and improved methods and apparatus of such character.

(2) Description of the Prior Art

While not limited thereto in its utility, the present invention is particularly well suited for association with the driving and mounting mechanism for a charge distribution chute which is suspended in the throat area of a blast furnace. In a typical case, the distribution chute is mounted from a rotatable casing which is positioned concentrically around a central feed spout. Means in the form of a first mechanical drive train imparts rotary motion to the casing, to thereby rotate the distribution chute, and a further drive train rotates with the casing and drives the chute so as to vary the angular orientation thereof with respect to the furnace vertical axis. Independent drive motors are associated with each of the drive trains. The charge distribution chute is affixed, at opposite sides and adjacent the upper or charge receiving end thereof, to a pair of horizontally oriented and axially aligned rotatable shafts in such a manner that the chute will move with these shafts. The shafts may be caused to rotate about their axis through the use of a pair of reduction gear boxes which form part of the drive train which causes the variations in distribution chute angular orientation; the gear boxes rotating with the casing.

A distribution chute drive and support mechanism of the type briefly described above is disclosed in U.S. Pat. No. 3,880,302. As shown in U.S. Pat. No. 3,880,302, the horizontal shafts to which the distribution chute is affixed pass through packings and bushings in the side walls of the reduction gear boxes. Sector gears are attached to the chute supporting shafts and rotary motion is imparted to the shafts by means of driving these sector gears. As the horizontal shafts pivot about their longitudinal axis, during the adjustment of the angular position of the distribution chute, the bearing surfaces and members, for example blocks and roller bearings, on which the shafts are supported in the walls of the reduction gear boxes must be systematically lubricated.

Access to the packings and bushings about the distribution chute supporting shafts is exceedingly difficult because of the harsh operating environment and since the shafts not only rotate about their common horizontal axis but also rotate with their respective reduction gear boxes about the longitudinal axis of the furnace central feed spout. Thus, the employment of lubrication pumps including electric drive motors is impractical both as a result of the high temperature and pressure of the operating environment and also as a result of the fact that the shafts rotate about two transverse axes which renders the delivery of electrical power to a pump exceedingly difficult. Similarly, direct feed by flexible lubricating tubes or rotating connection has been found to be impractical in part because of the large diameter of the path about which the shafts rotate during rotation of the casing.

In the prior art, lubrication of the bearing blocks and roller bearings on which the rotatable support shafts for a steerable charge distribution chute of a shaft furnace are mounted has been achieved through the provision of an oil or grease chamber which rotates together with the reduction gear boxes about the central feed spout of the furnace. For such oil or grease chambers to function adequately, a sufficient level of lubricant has to be maintained therein to insure that there will be lubricant outflow, through pipes under the effect of gravity, to the components to be lubricated. While the provision of such oil or grease chambers has had some limited success, a serious hermeticity problem is presented. Due to the high operating temperatures encountered, the oil or grease becomes extremely fluid so that it is very difficult to insure hermeticity. Even if the oil or grease level is checked each time the furnace is shut-down, there is an inherent risk of leakage and loss of lubricant during operation and, should this occur, the bushings and/or bearings will seize thus resulting in their destruction followed by a lengthy and expensive shutdown of the furnace for repair purposes.

SUMMARY OF THE INVENTION

The present invention overcomes the above-described and other deficiencies and disadvantages of the prior art by providing a novel technique for use in the lubrication of inaccessible moving parts and apparatus for use in the employment of such technique. Apparatus in accordance with a preferred embodiment of the present invention includes, in the environment of a blast furnace charging installation, a pair of mechanically actuated pumps which will rotate with reduction gear boxes which form part of the drive trains for varying the angular orientation of a charge distribution chute mounted within the throat of the furnace. The pumps each include an outlet conduit which communicates with the region between a rotatable shaft, to which the distribution chute is attached, and the bushings and/or bearings on which the shaft rotates. The pump is actuated, in accordance with a schedule, by a cam plate mounted on a sector gear; torque being transmitted to the shaft via the sector gear which is affixed thereto and driven by the reduction gears. The cam plate is preferably adjustable in position whereby the "time" of actuation of the pump may be selected. The pumps are supplied with lubricant from reservoirs which will typically be mounted on and thus will also rotate with the reduction gear boxes.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
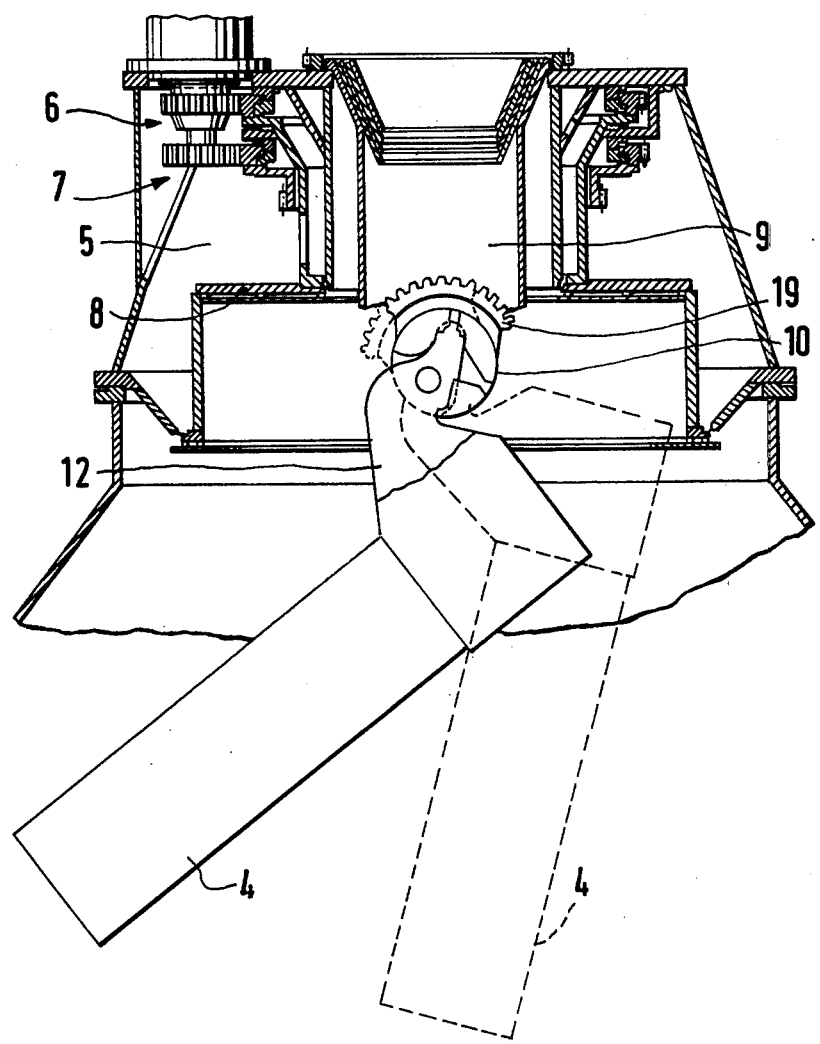
FIG. 1 is a schematic side elevation view partly in section, of the drive and suspension mechanism for a blast furnace charge distribution chute.

With reference to FIG. 1, a rotatable and angularly adjustable distribution chute 4 is schematically shown mounted in the throat of a shaft furnace by means of a combined drive and suspension mechanism 5. The drive and suspension mechanism 5 may, for example, be of the type disclosed in U.S. Pat. No. 3,880,302. The drive and suspension mechanism 5 includes a first gear train, indicated generally at 6, which controls the rotation of a casing 8 about a central feed conduit 9 through which the material with which the furnace is to be charged is supplied. The central feed conduit 9 is coaxial with the longitudinal axis of the furnace. Casing 8 is coaxial with feed conduit and is attached to distribution chute 4 whereby the rotation of casing 8 about conduit 9 results in rotary motion of chute 4. The drive and suspension mechanism 5 also includes a second gear train, indicated generally at 7, which controls the angular adjustment of chute 4 relative to the longitudinal axis of the furnace. Gear train 7 operates through a pair of gear boxes, which have been omitted from FIG. 1 in the interest of clarity, which move about the feed conduit 9 with the rotary casing 8. The gear trains 6 and 7 are driven by respective motors.

The upper end of distribution chute 4 is provided, at the opposite sides thereof, with arms 12. The arms 12 are shaped as shown in FIG. 1 and are keyed or otherwise affixed to a pair of oppositely disposed and generally horizontally oriented rotatable shafts 10. The shafts 10 pass through the casing 8 and rotate therewith. Each of the shafts 10, as may best be seen from FIG. 3, has a toothed sector gear 19 mounted thereon. The gears 19, when driven, will cause rotation of their associated shafts and thus produce angular displacement of the chute 4 relative to the longitudinal axis of the furnace and of the feed conduit 9. In FIG. 1 the feed chute 4 is shown in solid lines in a first angular position and in broken lines in a second angular position.

Figure 2:
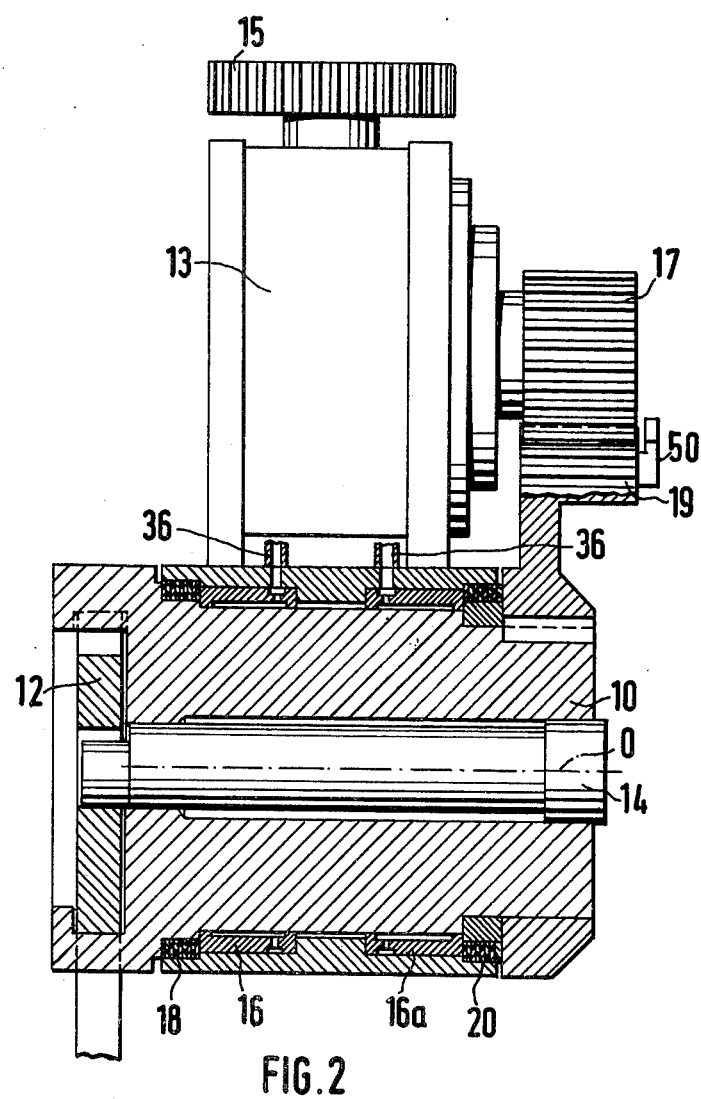
FIG. 2 is a cross-sectional front view, partly in section, of the drive train for imparting rotary motion to one side of the distribution chute of FIG. 1.

Referring to FIG. 2, the means by which the sector gear 19 is driven is shown schematically. In FIG. 2 a reduction gear box is indicated schematically at 13. In an actual distribution chute drive installation, there will be a pair of reduction gear boxes 13 positioned diametrically opposite one another with respect to the feed conduit 9. A gear 15 drives, via the reduction gear assembly 13, a pinion 17 which interacts with the sector gear 19. As noted above, sector gear 19 is integral with shaft 10 and thus the rotation of pinion 17 will result in shaft 10 rotating about its longitudinal axis 0. The gear 15 is driven by the gear train indicated generally at 7 in FIG. 1. For a more detailed description of the driving mechanism for distribution chute 4, reference may be had to aforementioned U.S. Pat. No. 3,880,302. Continuing to refer to FIG. 2, it may be seen that the arms 12 are affixed to their respective shafts 10 by means of rods 14 which are received in axial bores in the shafts 10.

In order to enable a shaft 10 to pivot about its longitudinal axis 0, the shaft is accommodated in bushings 16 and 16a. Sealing rings or packings 18 and 20 are provided to isolate the bearing surfaces between the bushings and shaft from the ambient operating environment and to prevent leakage of lubricant from the region between the bushings and shaft. To insure the correct operation of the mechanism, and particularly to prevent binding of shaft 10 which will prevent the angular adjustment of the distribution chute, the bushings 16 and 16a must be systematically lubricated. For the reasons described above, the provision of such lubrication has previously proved to be a very difficult task. The operating environment, which in the example being described is a shaft furnace which operates at a high pressure with high temperatures and in a gaseous atmosphere highly contaminated with particulate matter, precludes the use of conventional sealing rings and thus recourse must be had to the use of heat-resistant packings. The use of such heat-resistant packings, in turn, has prevented the successful provision of an oil bath since the requisite hermeticity can not be maintained.

Figure 3:
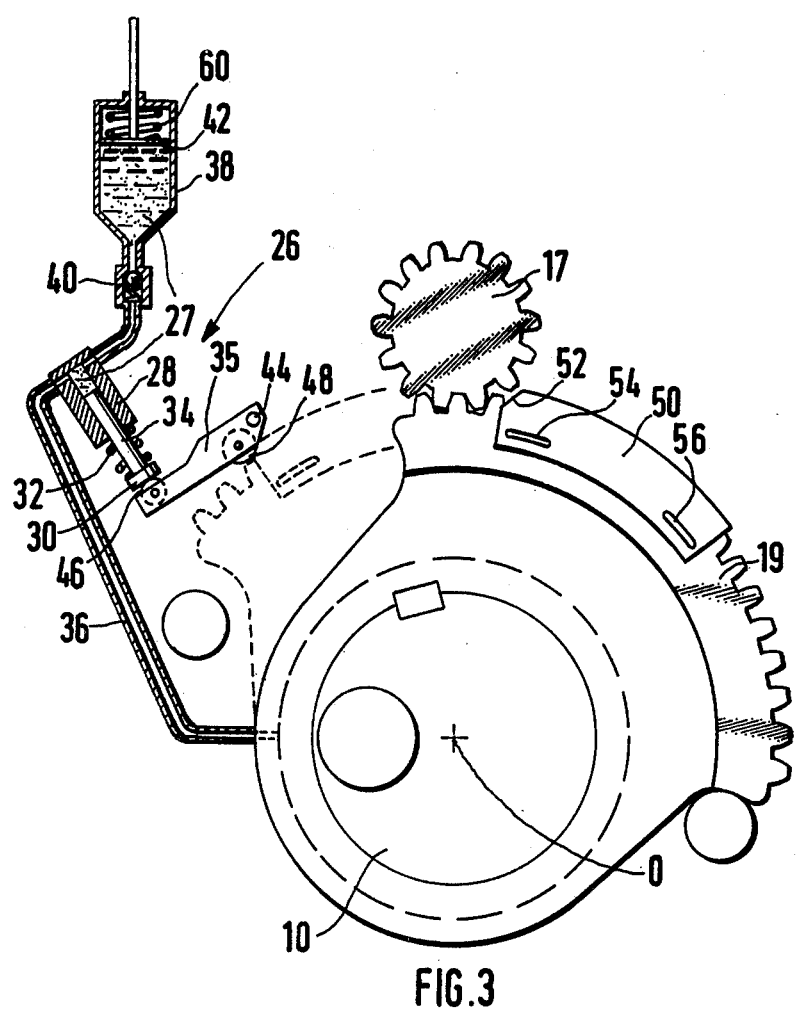
FIG. 3 is a schematic side elevation view, partly in section, of a lubrication system in accordance with the present invention.

In accordance with the present invention, as shown in FIG. 3, a lubricating pump as generally indicated at 26 is associated with each of the reduction gear mechanisms 13. The mounting of the lubricating pumps on the reduction gear mechanisms results in the pumps rotating about the feed conduit 9 with the reduction gear mechanisms. In the manner to be described below, each lubricating pump 26 introduces grease or some other suitable lubricant, under pressure, between the bushings 16 and 16a and the shaft 10. The lubricating pump 26 is actuated by the sector gear 19 in response to the rotation of gear 19 and shaft 10 about axis 0. In the disclosed embodiment the pump 26 is a force pump comprising a cylinder 28 and an ejector piston 34 which moves within cylinder 28 to eject a lubricant 27 from the pump and into a conduit 36. The lubricant will flow through conduit 36 from pump 26 to the region between shaft 10 and bushings 16 and 16a. The piston 34 of pump 26 is biased by a compression spring 32 which is positioned about the piston rod; the end of the piston rod being provided with a "pusher" 30 which is actuated by a pivoting arm 35 in the manner to be described below.

The lubricating pump 26 is continuously fed with grease or other lubricant from a tank 38. The tank 38 is also mounted on and thus moves with the reduction gear mechanism 13. Tank 38 communicates with the cylinder 28 of pump 26 via a check valve 40. A piston 42 is disposed within tank 38 and is subjected to the action of a spring 40 in such a manner as to force the lubricant contained within the tank into the cylinder 28. The tank 38 may be refilled with grease at regular intervals such as, for example, when the furnace is shut-down in accordance with a programmed operating schedule. The supply of lubricant in tank 38 may take the form of a replaceable cartridge.

The pivot arm 35 which cooperates with "pusher" 30 is mounted on and rotates about a shaft 44. Arm 35 is biased, in the counterclockwise direction, by the spring 32. A first end of arm 35; i.e., the arm furthest away from the pivot shaft 44, supports a roller 46 which cooperates with "pusher" 30. The employment of a freely rotating roller 46 for actuating the piston of pump 26 insures that piston 34 will always be urged in the direction of its longitudinal axis. Pivot arm 35 is also provided with a second freely rotating roller 48 which is mounted on the arm adjacent the second end thereof but at the same side of the pivot point as roller 46. Roller 48 is designed to interact with an arcuate outer surface of a plate 50 which is affixed to the side of sector gear 19 as shown. To facilitate the interaction between plate 50 and roller 48, the loading edge 52 of the plate is bevelled. The establishment of contact between roller 48 and bevelled surface 52 will cause arm 35 to pivot in opposition to the force of spring 32.

Plate 50 is preferably bolted onto sector gear 19 with the attachment bolts passing through a pair of elongated slots 54 and 56. This manner of attachment permits the angular position of plate 50 on gear 19 to be adjusted and thereby allows the point in the furnace charging cycle at which the arm 35 is rotated in opposition to the biasing spring 32 to be regulated. A stop, not shown in the drawing, may also be provided in order to prevent the arm 35 from being pivoted, under the action of spring 32, beyond a predetermined position such as, for example, the position shown in FIG. 3.

On FIGS. 1 and 3 the positions of the distribution chute 4 and sector gear 19 are shown in full lines to illustrate the fully raised position of the chute; i.e., the position wherein the charge material being delivered to the furnace is deposited about the periphery of the furnace hearth. In order to change the angular relationship of chute 4 so as to turn the chute toward the vertical axis of the furnace, the pinion 17 is driven in such a manner as to cause the sector gear 19 to pivot about the longitudinal axis 0 in the counterclockwise direction. As chute 10 is lowered, the sector gear 19 approaches the position shown in broken lines in FIGS. 1 and 3.

In accordance with the disclosed embodiment of the present invention, pivot arm 35 and cam plate 50 are positioned relative to one another such that, starting from the angular position of chute 4 shown in broken lines in FIG. 3 which corresponds to the chute being oriented at an angle of approximately 10° with respect to the vertical axis of the furnace, the plate 50 will actuate pump 26 by causing arm 35 to pivot against the force of spring 32. Thus, the displacement of chute 4 toward the vertical orientation from the predetermined angular position, such as the 10° angle discussed above, will actuate pump 26 thereby causing lubrication of shaft 10. During movement of chute 4 away from the vertical axis of the furnace, pinion 17 is actuated so as to pivot sector gear 19 in the clockwise direction as the apparatus is shown in FIG. 3. This clockwise movement discontinues the contact between roller 48 and plate 50, starting from the angular position of the sector gear shown in broken lines in FIG. 3, and thus permits the piston 34 of pump 26 to be retracted under the effect of spring 32. Retraction of piston 34 will permit cylinder 28 to be reloaded with lubricant supplied from reservoir 38; the recharging of cylinder 28 resulting from the movement of piston 42 in reservoir 38 under the influence of spring 44.

In the typical furnace charging operation, the charge material is deposited on the furnace hearth either in a spiral pattern or in concentric circles. During charging of the furnace the angular orientation of the distribution chute with respect to the furnace axis will typically vary between 10° and 50°. Angular distribution chute orientations of less than 10° with respect to the furnace vertical axis, where the charge material will drop substantially vertically onto the hearth, are employed only in exceptional cases. The present invention thus makes it very easy to regulate the position of chute 4 periodically as far as the vertical position, in accordance with the frequency determined by lubricating requirements, for the purpose of insuring adequate lubrication of shaft 10 by the interaction between sector gear mounted plate 50 and the pump actuating pivot arm 35. The lubricating operation can obviously be carried out simultaneously with the delivery of charge material to the center region of the furnace hearth.

The frequency of lubrication and the capacity of pump 26 must be coordinated so as to insure optimum lubrication; i.e., to prevent either excessive or inadequate lubricant between the shafts 10 and their associated bushings. The present invention permits the distribution chute angle at which lubrication will commence to be selected to achieve the desired results. It is to be noted that pump 26 may also be arranged such that it will be actuated by the end of plate 50 opposite to the end shown in FIG. 3 as having the beveled surface 52 formed thereon. In such case lubrication of shafts 10 would be effected when the distribution chute 4 is raised beyond a certain angular orientation such as, for example, 50°. Regardless of when pump 26 is actuated, a very small quantity of lubricant is generally sufficient since both the speed and the amplitude of rotation of shafts 10 are moderate.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. Apparatus for providing lubrication to a rotatable shaft positioned within a blast furnace, the shaft to be lubricated having affixed thereto a steerable charge distribution chute, the rotatable shaft being movable with a transversely rotatable member and also having affixed thereto a drive gear whereby the chute will rotate with the member about a first axis and will rotate with the shaft about a second axis transverse to the first axis, said lubrication providing apparatus comprising:
 normally inoperative lubricating means mounted for movement with said rotatable member about said first axis;
 means affixed to the drive gear for operating said lubricating means when the distribution chute reaches a predetermined angular position; and
 means for delivering lubricant from said lubricating means to the surface of the shaft when said lubricating means is operated by said operating means.

2. The apparatus of claim 1 wherein said operating means comprises:
 a cam plate mounted on the drive gear.

3. The apparatus of claim 2 wherein said cam plate is adjustable on the drive gear to vary the angular position of the chute at which said lubricating means will be operated.

4. The apparatus of claim 1 wherein said lubricating means comprises:
 a mechanically operated pump, said pump including a piston movable in a cylinder;
 reservoir means for furnishing lubricant to said pump cylinder; and
 means for causing reciprocation of the piston of said pump, said reciprocation causing means being actuated by said operating means.

5. The apparatus of claim 4 wherein said lubricating means further comprises:
 means for delivering lubricant from said reservoir means to said pump cylinder when said pump is in the inoperative state.

6. The apparatus of claim 1 wherein said lubricating means comprises:
 a mechanically operated pump, said pump including a piston movable in a cylinder;

reservoir means for furnishing lubricant to said pump cylinder; and means for causing reciprocation of the piston of said pump, said reciprocation causing means being actuated by said operating means.

7. The apparatus of claim 6 wherein said lubricating means further comprises:

means for delivering lubricant from said reservoir means to said pump cylinder when said pump is in the inoperative state.

8. The apparatus of claim 5 wherein said operating means comprises:

a cam plate mounted on the drive gear.

9. The apparatus of claim 8 wherein said cam plate is adjustable on the drive gear to vary the angular position of the chute at which said lubricating means will be operated.

10. The apparatus of claim 8 wherein said means for causing reciprocation comprises:

pivot arm means, said pivot arm means being positioned for cooperation with said cam plate;

means coupling said pivot arm means to said pump piston whereby said cam plate will cause movement of said piston in a first direction; and resilient biasing means for moving said pivot arm in a direction opposite to said first direction upon discontinuance of contact between said pivot arm means and said cam plate.

11. The apparatus of claim 10 wherein said cam plate is adjustable on the drive gear to vary the angular position of the chute at which said lubricating means will be operated.

12. The apparatus of claim 11 wherein said lubricating means further comprises:

means for delivering lubricant from said reservoir means to said pump cylinder when said pump is in the inoperative state.

* * * * *